United States Patent
Fuwa et al.

(10) Patent No.: US 7,668,642 B2
(45) Date of Patent: Feb. 23, 2010

(54) CONTROL APPARATUS FOR INTERNAL COMBUSTION ENGINE

(75) Inventors: Naohide Fuwa, Aichi-ken (JP); Masanori Abino, Toyota (JP); Tomohiro Sato, Takahama (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 270 days.

(21) Appl. No.: 11/920,575

(22) PCT Filed: May 22, 2006

(86) PCT No.: PCT/JP2006/310607

§ 371 (c)(1),
(2), (4) Date: Nov. 16, 2007

(87) PCT Pub. No.: WO2006/126698

PCT Pub. Date: Nov. 30, 2006

(65) Prior Publication Data

US 2009/0157283 A1 Jun. 18, 2009

Related U.S. Application Data

(63) Continuation of application No. PCT/JP2006/310607, filed on May 22, 2006.

(30) Foreign Application Priority Data

May 23, 2005 (JP) .............................. 2005-149527

(51) Int. Cl.
G06F 19/00 (2006.01)
F02N 17/00 (2006.01)

(52) U.S. Cl. ................... 701/112; 701/104; 123/179.4

(58) Field of Classification Search .............. 123/90.11, 123/90.15–90.18, 179.3, 179.4, 179.16, 198 D, 123/198 DB, 491; 701/101–105, 110, 112, 701/113, 115; 180/65.21, 65.28; 903/905
See application file for complete search history.

(56) References Cited

U.S. PATENT DOCUMENTS 2,699,161 A * 1/1955 Pees ..................... 123/198 DC
6,166,525 A * 12/2000 Crook ......................... 322/11
6,260,535 B1 7/2001 Froeschl et al.

(Continued)

FOREIGN PATENT DOCUMENTS

DE 195 17 675 A1 11/1996

(Continued)

Primary Examiner—Willis R Wolfe, Jr.
(74) Attorney, Agent, or Firm—Kenyon & Kenyon LLP

(57) ABSTRACT

An electronic control unit executes a delay control and a load compensation control. In the delay control, the period from when an engine stop request for an engine is made to when the engine is actually stopped is extended. In the load compensation control, the engine power is adjusted according to the driving load of auxiliary devices. Further, if the engine stop request is made during operation of a compressor, which is one of the auxiliary devices, the electronic control unit executes a power reduction control, in which ignition timing is retarded to temporarily reduce the engine power. As a result, in an internal combustion engine that executes the delay control, sudden increases in the engine speed that are likely to occur when an engine stop request is made during operation of auxiliary devices are reliably suppressed.

15 Claims, 8 Drawing Sheets

U.S. PATENT DOCUMENTS

| | | | |
|---|---|---|---|
| 7,055,312 B2 * | 6/2006 | Osawa et al. | 180/65.28 |
| 7,216,618 B2 * | 5/2007 | Iwatsuki et al. | 123/179.4 |
| 7,322,323 B2 * | 1/2008 | Kawasaki et al. | 123/90.15 |
| 2002/0050269 A1 | 5/2002 | Osanai | |
| 2004/0206332 A1 | 10/2004 | Mathews et al. | |
| 2006/0065223 A1 | 3/2006 | Freisinger | |
| 2009/0132154 A1 * | 5/2009 | Fuwa et al. | 701/112 |

FOREIGN PATENT DOCUMENTS

| | | | |
|---|---|---|---|
| DE | 103 22 305 A1 | 12/2004 | |
| JP | 06-213150 | 8/1994 | |
| JP | 2002-161766 A | 6/2002 | |
| JP | 2002-357136 A | 12/2002 | |
| JP | 2003293829 A * | 10/2003 | 701/112 |

* cited by examiner

CONTROL APPARATUS FOR INTERNAL COMBUSTION ENGINE

This is a continuation application of PCT/JP2006/310607 filed 22 May 2006, which claims priority of Japanese Patent Application No. 2005-149527 filed 23 May 2005, the contents of which are incorporated herein by reference.

FIELD OF THE INVENTION

The present invention relates to a control apparatus for an internal combustion engine.

BACKGROUND OF THE INVENTION

A type of control apparatus for an internal combustion engine has been proposed that performs a delay control for extending the period from when an engine stop request (for example, the driver's turning off the ignition switch) is made to when the engine is actually stopped.

For example, Japanese Laid-Open Patent Publication No. 2002-161766 discloses a configuration for executing delay control in an internal combustion engine having a variable valve actuation mechanism for changing valve parameters of the engine valves such as intake valves and exhaust valves. The internal combustion engine disclosed in the publication has a hydraulic pump driven by the power of the engine. Hydraulic pressure generated by the hydraulic pump is used to actuate the variable valve actuation mechanism. The variable valve actuation mechanism is activated after the delay control is started to change the valve parameter to a state suitable for the next starting of the engine. This improves the startability of the engine in the next starting.

In this manner, the power of the engine is not only used as a power source of the vehicle, but also as a power source for actuating auxiliary devices such as the hydraulic pump, a compressor of a vehicle air-conditioner, and an alternator.

When the driving load of the auxiliary devices is increased with respect to the engine power, a corresponding amount of the engine power is consumed for driving the auxiliary devices. This reduces the engine speed. Thus, a load compensation control is normally executed in which the engine power is adjusted in accordance with the driving load of the auxiliary devices. One example of such load compensation control is an idle speed control executed during idling. In the idle speed control, the engine power is adjusted such that the engine speed during idling seeks a predetermined target idle speed. For example, when the load of the auxiliary devices increases and the engine speed is less than a target engine speed, the intake air amount is increased. The fuel injection amount is increased accordingly. This increases the engine power, so that the engine speed is increased to the target idle speed. Since the driving load of the compressor is greater than that of other auxiliary devices, the target idle speed is set higher when the compressor is operating than when it is not operating.

In an internal combustion engine that executes the load compensation control, the execution of the delay control is expected to cause the following disadvantages.

When an engine stop request is made while auxiliary devices are operating, the auxiliary devices are stopped. The intake air amount that has been increased in accordance with the driving load of the auxiliary devices is reduced according to the reduction in the driving load caused by stopping of the auxiliary devices. Since the rate at which the intake air amount is reduced is less than the rate of reduction in the driving load caused by stopping of the auxiliary devices, a response delay occurs in reduction in the engine power relative to the reduction in the driving load according to the stopping of the auxiliary devices.

In the case of an internal combustion engine that does not execute the delay control, such a response delay accompanying reduction in the engine power is unlikely to occur since the engine is stopped immediately after an engine stop request is made.

On the other hand, an internal combustion engine that executes the delay control continues operating for a certain period of time after an engine stop request is made. Therefore, the above described response delay occurs when the engine power is reduced after the engine stop request is made. Such a response delay during the delay control results in a period in which the engine power is not sufficiently reduced even if the driving load of the auxiliary devices have been reduced. This results in a sudden increase in the engine speed. Particularly, when such a sudden increase in the engine speed occurs when a driver makes an engine stop request, the engine speed is increased despite the intention of the driver to stop the engine. This causes the driver to feel uncomfortable.

SUMMARY OF THE INVENTION

Accordingly, it is an objective of the present invention to provide a control apparatus for an internal combustion engine executing a delay control, which apparatus is capable of reliably suppressing sudden increases in the engine speed that is likely to occur when an engine stop request is made during operation of auxiliary devices.

To achieve the foregoing objectives, the present invention provides a control apparatus for an internal combustion engine. An auxiliary device driven by the engine is coupled to the engine. The apparatus executes a delay control for extending the period from when an engine stop request is made to when the engine is actually stopped, and a load compensation control for adjusting engine power in accordance with a driving load of the auxiliary device. The apparatus includes a power adjusting section. When the engine stop request is made while the auxiliary device is operating, the power adjusting section executes a power reduction control for changing an engine control value such that the engine power is temporarily reduced.

DETAILED DESCRIPTION

First Embodiment

A controlling apparatus for an internal combustion engine 1 according to a first embodiment of the present invention will now be described with reference to FIGS. 1 to 7.

Figure 1:
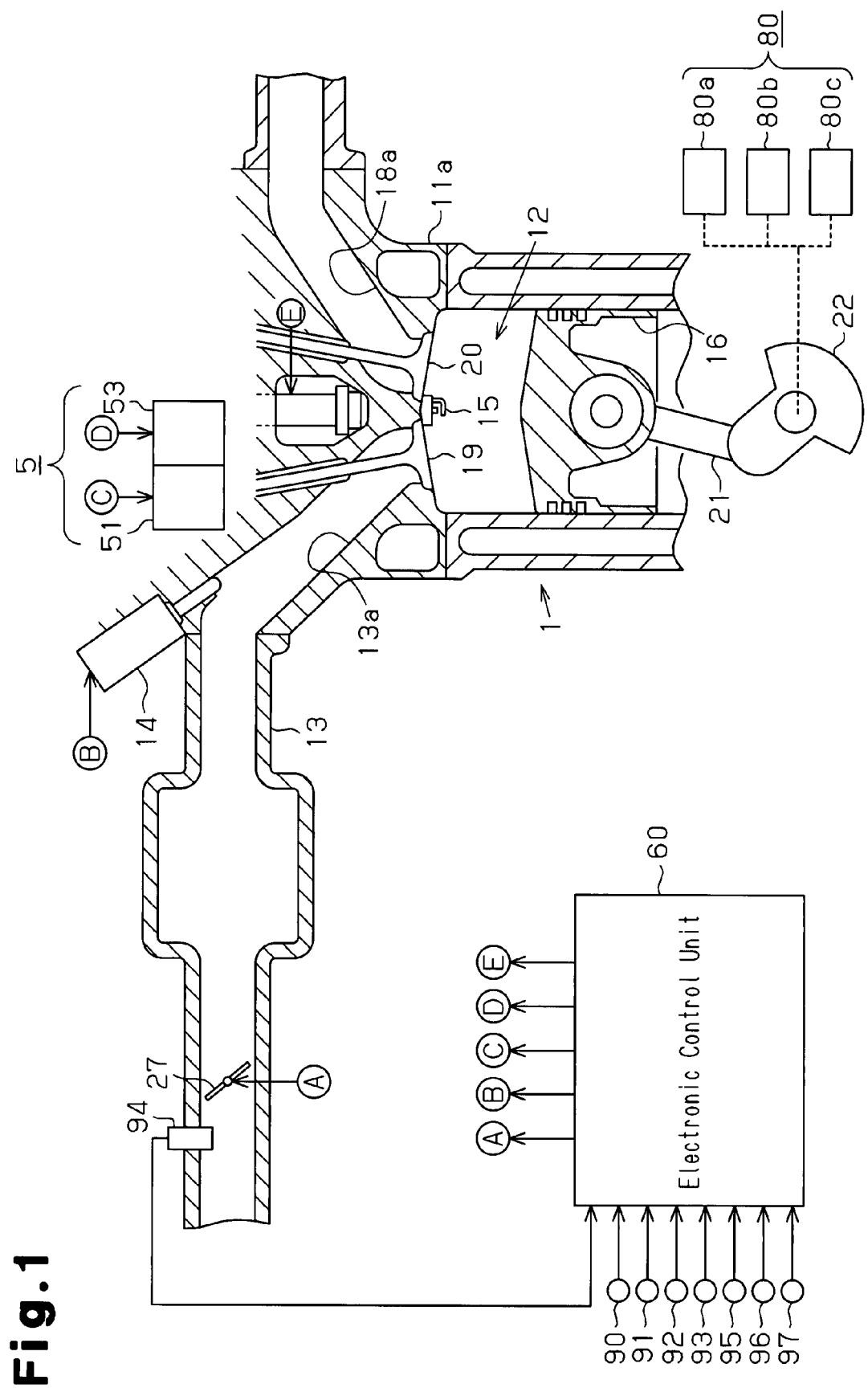
FIG. 1 is a diagram illustrating an internal combustion engine to which a control apparatus according to a first embodiment of the present invention is applied.

FIG. 1 illustrates the configuration of the engine 1 according to this embodiment. The engine 1 includes a variable valve actuation unit 5.

As shown in FIG. 1, air is drawn into the combustion chamber 12 through an intake passage 13 and an intake port 13a. The fuel injection valve 14 provided in the intake passage 13 supplies fuel the amount of which corresponds to the intake air amount to the combustion chamber 12. When the air-fuel mixture is ignited by the ignition plug 15, the air-fuel mixture is burned. This causes the piston 16 to reciprocate. The reciprocation of the piston 16 is transmitted to a crankshaft 22 with a connecting rod 21 to rotate the crankshaft 22. The crankshaft 22 is coupled to a group of auxiliary devices 80 such as an air conditioner compressor 80a, an alternator 80b, a hydraulic pump 80c. The auxiliary device group 80 is actuated by the power of the engine 1. The compressor 80a is a fixed displacement type having a fixed volume of a compression chamber. The discharge pressure of refrigerant changed in synchronization of changes in the engine speed. The drive shaft of the compressor 80a and the crankshaft 22 are connected and disconnected to and from each other through engagement and disengagement of a clutch mechanism. The compressor 80a is actuated and stopped accordingly.

A throttle valve 27, which functions as an adjusting valve for adjusting the intake air amount, is provided in the intake passage 13. The opening degree of the throttle valve 27 is adjusted by controlling a motor for opening and closing the throttle valve 27.

The intake port 13a and the combustion chamber 12 are connected to and disconnected from each other by opening and closing the intake valve 19, while an exhaust port 18a and the combustion chamber 12 are connected to and disconnected from each other by opening and closing the exhaust valve 20. The intake valve 19 and the exhaust valve 20 are opened and closed in accordance with rotation of an intake camshaft and an exhaust camshaft to which rotation of the crankshaft is transmitted.

The variable valve actuation unit 5 is provided in a cylinder head 11a of the engine 1 to change the valve parameters of the intake valve 19. The variable valve actuation unit 5 includes a variable valve timing mechanism 51 that changes the valve timing of the intake valve 19, and a variable valve duration mechanism 53 that changes a maximum valve lift VL and a valve duration INCAM of the intake valve 19. The valve duration INCAM of the intake valve 19 corresponds to a period during which the intake valve 19 is open.

Figure 2:
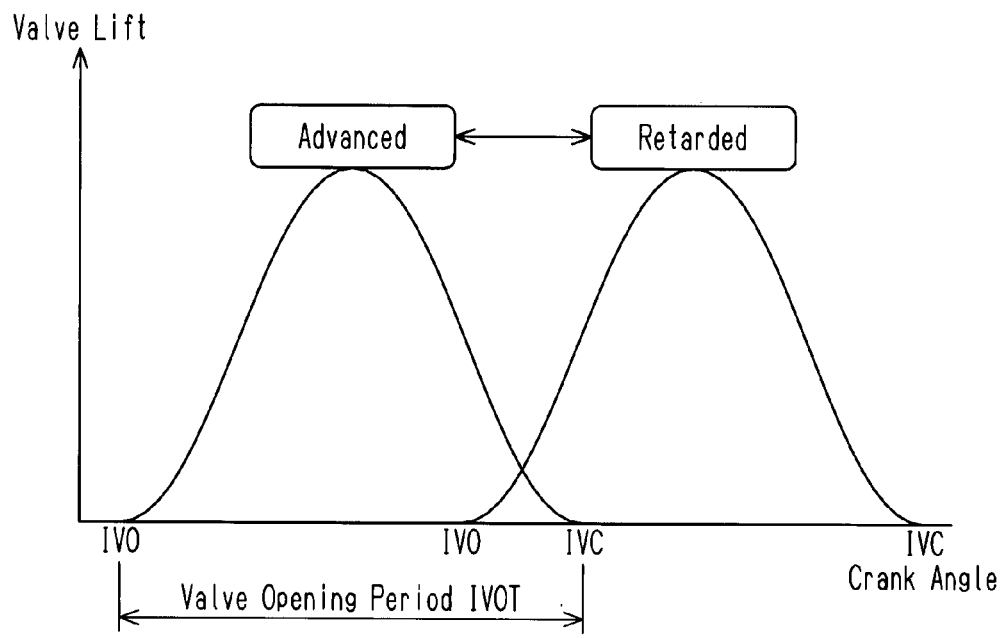
FIG. 2 is a schematic diagram showing the valve timing of an intake valve changed by a variable valve timing mechanism according to the first embodiment.

The variable valve timing mechanism 51 is actuated by hydraulic pressure generated by a hydraulic pump 80c. The variable valve timing mechanism 51 changes the relative rotational phase between the intake camshaft actuating the intake valve 19 and the crankshaft of the engine 1, thereby varying the valve timing INVT of the intake valve 19. As the valve timing INVT is changed, the point at which the intake valve 19 opens (IVO) and the point at which the intake valve 19 closes (IVC) are both advanced or retarded by the same degrees of crank angle. That is, in the state where the period during which the intake valve 19 is open (IVOT) is constant as shown in FIG. 2, the intake valve opening point IVO and the intake valve closing point IVC are advanced or retarded. When the valve timing INVT is retarded, the valve opening point IVO of the intake valve 19 is retarded. This reduces the valve overlap.

Figure 3:
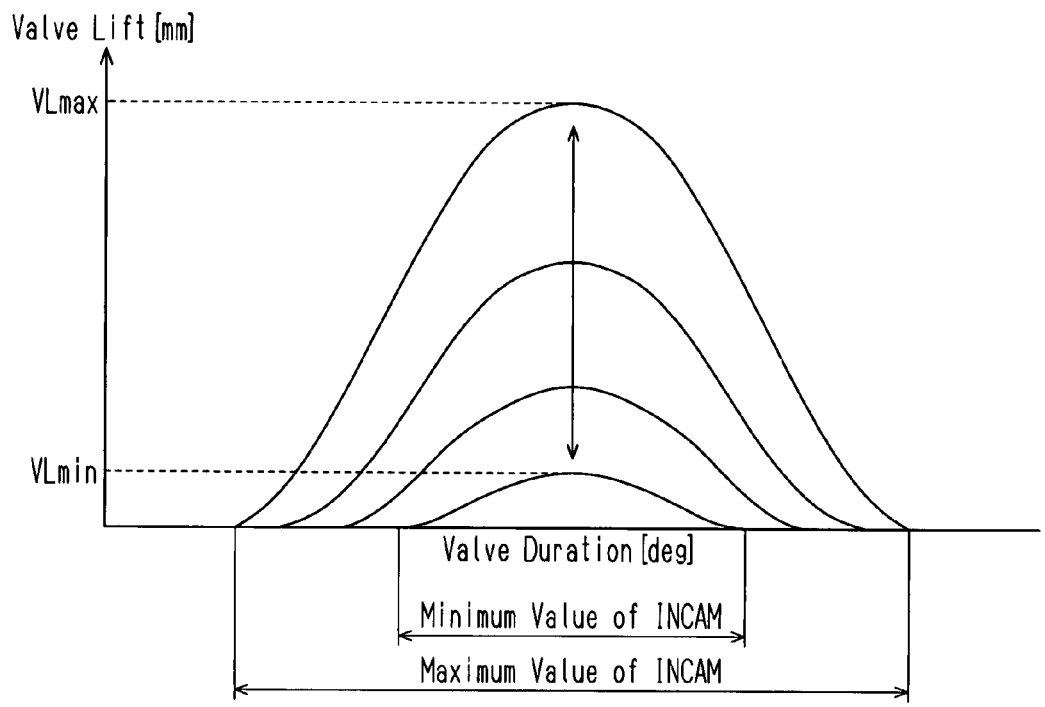
FIG. 3 is a schematic diagram showing the valve duration and the maximum valve lift of the intake valve changed by a variable valve duration mechanism according to the first embodiment.

The variable valve duration mechanism 53 changes the valve duration INCAM, which is the valve opening period IVOT, and the maximum value of the valve lift, which is the maximum valve lift VL, of the intake valve 19. The variable valve duration mechanism 53 is actuated by an electric motor. In other words, the variable valve duration mechanism 53 is actuated by using the electricity generated by the alternator 80b (in reality, the electricity of the battery charged by actuation of the alternator 80b). As shown in FIG. 3, the variable valve duration mechanism 53 continuously changes the maximum valve lift VL of the intake valve 19 between an upper limit valve lift VLmax and a lower limit valve lift VLmin. In synchronization with the continuous change in the maximum valve lift VL, the valve duration INCAM of the intake valve 19 is continuously changed. That is, as the maximum valve lift VL is reduced, the valve duration INCAM is reduced accordingly. The valve duration INCAM is maximum at the upper limit lift VLmax, and the valve duration INCAM is minimum at the lower limit lift VLmin.

The engine 1 has various sensors for detecting the operating state of the engine 1. For example, a crank angle sensor 90 detects the rotational phase of the crankshaft, or the crank angle. The engine speed NE is obtained from signals from the crank angle sensor 90. An accelerator pedal sensor 91 detects the depression amount of an accelerator pedal (accelerator pedal depression degree ACCP), and a throttle sensor 92 detects the opening degree of the throttle valve 27 (throttle opening degree TA). Also, the pressure of refrigerant discharged by the compressor 80a, that is, a discharge pressure COMP is detected by a pressure sensor 93. The amount of intake air GA drawn into the combustion chamber 12 is detected by an intake air amount sensor 94. The current value of the valve duration INCAM of the intake valve 19, in other words, an operation position of the variable valve duration mechanism 53, is detected by a valve duration sensor 95. The current value of the valve timing INVT of the intake valve 19 is detected by a valve timing sensor 96. Also, whether the driver has made an engine stop request is determined based on the state of an ignition switch 97, or whether the ignition switch 97 is on or off.

Various control procedures of the engine 1 are executed by an electronic control unit 60. The electronic control unit 60 has a microcomputer as a main component and receives various detected signals from the sensor listed above. Based on these signals, a central processing unit (CPU) of the electronic control unit 60 performs computation processes according to programs and control data stored in memory. Based on the computation results, the CPU performs various control processes. For example, the CPU controls the operation of the ignition plug 15 and the fuel injection valve 14 based on the engine operating state detected by the above listed sensors. Based on the accelerator pedal depression degree ACCP, the CPU sets a target value of the opening degree of the throttle valve 27, and controls the throttle valve 27, such that the opening degree of the throttle valve 27 seeks the target value. The CPU also controls the actuation of the variable valve timing mechanism 51 and the variable valve duration mechanism 53, such that the valve parameters (the valve timing INVT and the valve duration INCAM) of the intake valve 19 seek values that correspond to the engine operating state.

When the driver turns off the ignition switch 97, that is, when an engine stop request is made by the driver, the fuel injection and the fuel ignition are readily stopped. In other words, the engine 1 is stopped. Accordingly, the generation of hydraulic pressure acting as the drive source of the variable valve timing mechanism 51 and the generation of electricity acting as the drive source of the variable valve duration mechanism 53 are stopped. Therefore, the variable valve actuation unit 5 is stopped with the valve parameters immediately before stopping of the engine 1. The valve parameters after the engine is stopped are the same as the valve parameters immediately before the engine is stopped, that is, the valve parameters that have been set during the operation of the engine. These valve parameters are not necessarily suitable for starting the engine. Thus, depending on the conditions, the starting performance of the engine 1 could be degraded next time the engine 1 is started.

Accordingly, in this embodiment, a delay control is performed for extending the period from when an engine stop request is made to when the engine 1 actually stops. After the delay control is started, that is, while the hydraulic pressure and electricity are being generated, the variable valve timing mechanism 51 and the variable valve duration mechanism 53 are actuated to change the valve parameters (the valve timing and the valve duration) to predetermined values suitable for starting the engine 1.

Figure 4:
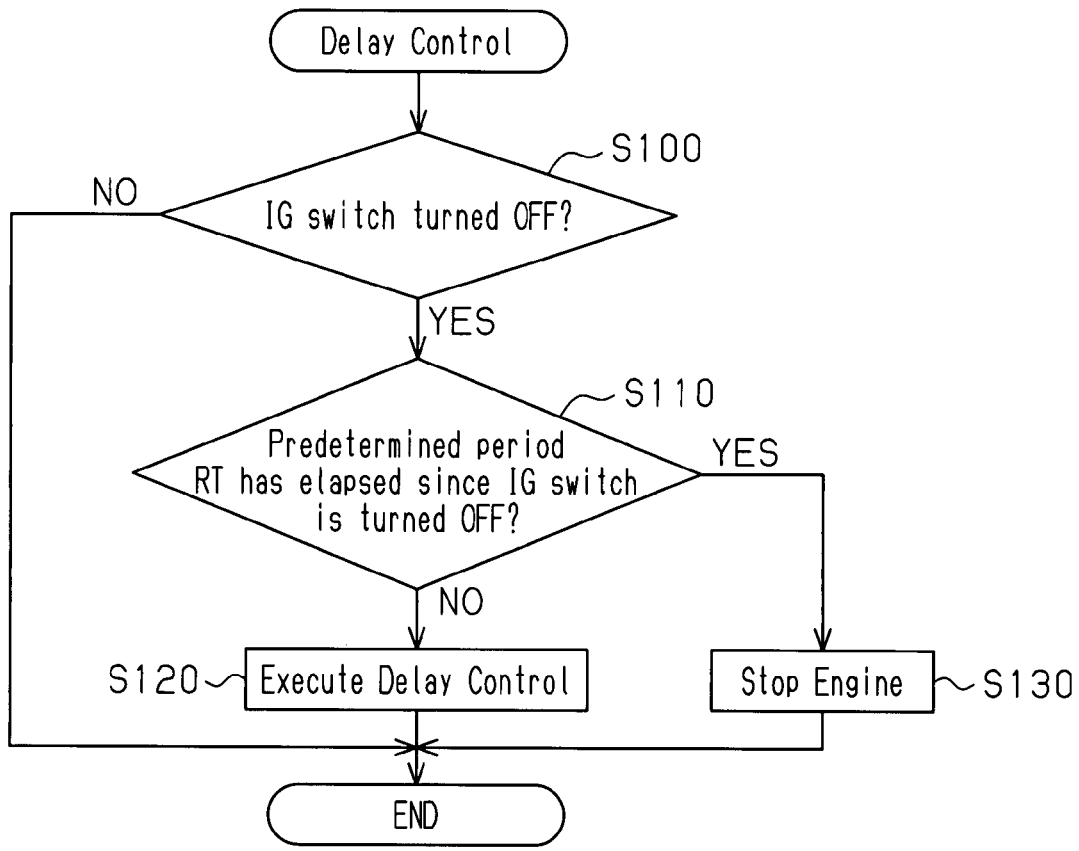
FIG. 4 is a flowchart showing a procedure of a delay control according to the first embodiment.

FIG. 4 shows the procedure of the delay control. The delay control is repeated at predetermined time intervals by the electronic control unit 60.

When the process is started, whether the ignition switch 97 is turned off is determined at step S100. If it is determined that the ignition switch 97 is not turned off (NO at S100), this process is temporarily suspended.

On the other hand, when it is determined that the ignition switch 97 is turned off (YES at S100), whether a predetermined period RT has elapsed since the ignition switch 97 was turned off is determined at next step S110. The predetermined period RT is set in advance as a sufficient period required for changing the valve timing INVT at the time of turning the ignition switch 97 off to valve timing suitable for starting the engine 1.

If it is determined that the predetermined period RT has not elapsed (NO at S110), the delay control is executed. That is, even if the ignition switch 97 is off, the fuel injection and the fuel ignition are continued. During the execution of the delay control, the variable valve timing mechanism 51 and the variable valve duration mechanism 53 are driven to change the valve parameters of the intake valve 19 (the valve timing INVT and the valve duration INCAM) to the predetermined values suitable for starting the engine 1.

On the other hand, when it is determined that the predetermined period RT has elapsed (YES at S110), it is determined that the process for changing the valve parameters of the intake valve 19 to the predetermined values suitable for starting the engine 1 has been completed. In this case, the fuel injection and the fuel ignition are stopped for stopping the delay control. That is, the engine 1 is stopped at step S130, and the process is temporarily suspended.

When the delay control is started, the valve timing and the valve duration of the intake valve 19 are changed to the values suitable for starting the engine 1.

On the other hand, some of the power of the engine 1 is used for actuating the auxiliary devices 80. If the compressor 80*a*, the alternator 80*b*, and the hydraulic pump 80*c* are demanded to operate at a higher power, the driving load of the auxiliary devices 80 is increased. Accordingly, the increased amount of the driving load of the auxiliary devices 80 consumes the engine power. This reduces the engine speed. Thus, a load compensation control is executed in which the engine power is adjusted in accordance with the driving load of the auxiliary devices 80. Specifically, an idle speed control is executed during idling.

In the idle speed control, the engine power is adjusted such that the engine speed NE during idling seeks a predetermined target idle speed PNE. For example, when the load of the auxiliary devices 80 is increased, the engine speed NE falls below the target idle speed PNE. In accordance with the deviation of the engine speed NE, the opening degree of the throttle valve 27 is increased so that the intake air amount GA is increased. When the intake air amount GA is increased, the fuel injection amount is also increased so that the engine power is increased. The engine speed NE is thus increased to the target idle speed PNE. On the other hand, when the load of the auxiliary devices 80 is reduced, the engine speed NE exceeds the target idle speed PNE. In accordance with the deviation of the engine speed NE, the opening degree of the throttle valve 27 is reduced so that the intake air amount GA is reduced. When the intake air amount GA is reduced, the fuel injection amount is also reduced so that the engine power is reduced. The engine speed NE is thus lowered to the target idle speed PNE.

The driving load of the compressor 80*a* is greater than that of other auxiliary devices (for example, the alternator 80*b* and the hydraulic pump 80*c*). Therefore, when the compressor 80*a* is operating, an idle-up control is executed in addition to the idle speed control. In the idle-up control, the target idle speed PNE is set to a higher value compared to that in the case where the compressor 80*a* is not operating, so that the engine speed is further increased.

As described above, the delay control and the load compensation control are executed in the engine 1 of the present embodiment. However, simultaneous execution of these processes is likely to cause the following disadvantages.

That is, when an engine stop request is made while the auxiliary devices 80 are operating, the auxiliary devices 80 are stopped. The intake air amount that has been increased in accordance with the driving load of the auxiliary devices 80 is reduced according to the reduction in the driving load caused by stopping of the auxiliary devices 80. Since the rate at which the intake air amount GA is reduced is less than the rate of reduction in the driving load caused by stopping of the auxiliary devices 80, a response delay occurs in reduction in the engine power relative to the reduction in the driving load according to the stopping of the auxiliary devices 80.

When the delay control is not executed in the engine 1, an engine stop request is immediately followed by stopping of the engine 1. Thus, a response delay related to reduction in the engine power as described above is unlikely to occur.

However, since the delay control is executed in the engine 1 of the present embodiment, the engine 1 continues operating for a certain period of time after an engine stop request is made. Therefore, the above described response delay occurs when the engine power is reduced after the engine stop request is made. Such a response delay during the delay control results in a period in which the engine power is not sufficiently reduced even if the driving load of the auxiliary devices 80 have been reduced. This can temporarily and suddenly increase the engine speed. Particularly, when such a sudden increase in the engine speed occurs when a driver makes an engine stop request, the engine speed is increased despite the intention of the driver to stop the engine. This causes the driver to feel uncomfortable.

Also, as described above, the driving load of the compressor 80a is greater than that of other auxiliary devices (for example, the alternator 80b and the hydraulic pump 80c). Thus, the engine speed is increased by a greater degree when the compressor 80a is stopped than when an engine stop request is made and the other auxiliary devices are stopped.

Accordingly, in the present embodiment, to suppress sudden increases in the engine speed that is likely to occur when an engine stop request is made during operation of the auxiliary devices 80, a power reduction control described below is executed.

Since the driving load of the compressor 80a is greater than that of other auxiliary devices (for example, the alternator 80b and the hydraulic pump 80c), the engine power is increased by a greater degree in the load compensation control. Therefore, the engine speed is increased by a greater degree when an engine stop request is made during the operation of the compressor 80a than when an engine stop request is made during the operation of the other auxiliary devices. Conversely, the engine speed is increased by a relatively small degree when an engine stop request is made during the operation of the other auxiliary devices. In this embodiment, when there is an engine stop request during the operation of the compressor 80a, the power reduction control is executed. When an engine stop request is made during the operation of the other auxiliary devices, the power reduction control may be executed as well.

Figure 5:
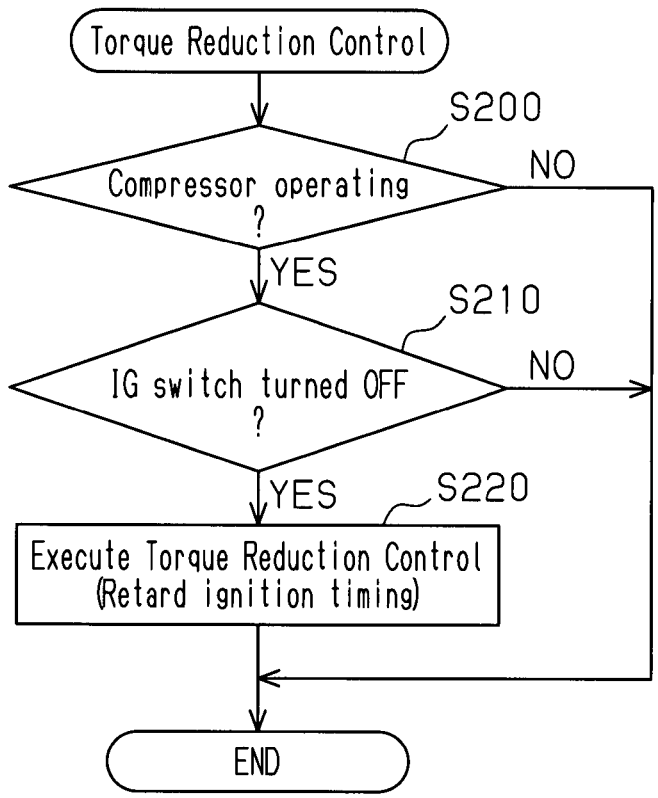
FIG. 5 is a flowchart showing a procedure of a torque reduction process according to the first embodiment.

FIG. 5 shows the procedure of the power reduction control (hereinafter, referred to as a torque reduction control). The torque reduction control shown in FIG. 5 is repeated at predetermined time intervals by the electronic control unit 60.

When the process is started, whether the compressor 80a is currently operating is determined (S200). For example, the operational state is determined based on, for example, the on/off state of the air conditioner switch. If it is determined that the compressor 80a is not operating (NO at S200), this process is temporarily suspended.

On the other hand, when the compressor 80a is operating (YES at S200), whether the IG switch 97 has been turned off is determined (S210). If it is determined that the IG switch 97 has not been turned off (NO at S210), this process is temporarily suspended since the delay control has not been initiated.

On the other hand, if it is determined that the IG switch 97 has been turned off (YES at S210), the torque reduction control is executed at the same time as the delay control is initiated (S220).

When the torque reduction control is executed, an engine control value is changed by a predetermined degree to temporarily reduce the engine power. Specifically, the ignition timing, which is set according to the operating state of the engine 1, is retarded by a predetermined amount (period of time). The adjustment of the engine power by retarding the ignition timing has a better responsiveness than adjustment by reducing the intake air amount or the fuel injection amount. That is, retarding of the ignition timing can quickly change the engine power. The engine power is thus temporarily and quickly reduced by retarding the ignition timing.

Figure 6:
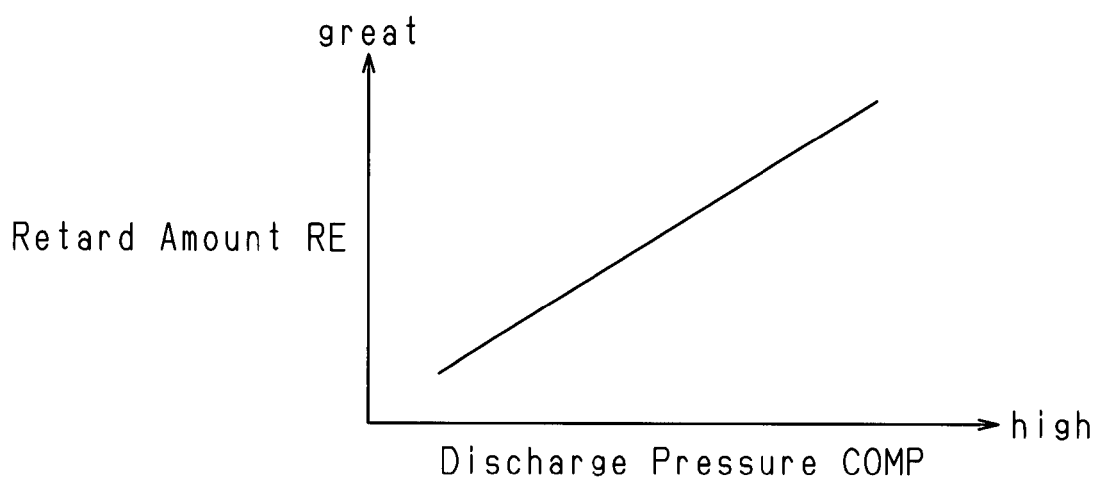
FIG. 6 is a conceptual diagram showing the amount of retard set based on an discharge pressure.

The retard amount RE of the ignition timing in the ignition retard is set in the following manner. That is, the greater the driving load of the auxiliary devices 80 immediately before an engine stop request is made, the greater the amount of required increase in the engine power becomes. Thus, as the driving load increases, the degree of a sudden increase in the engine speed is increased. Accordingly, as shown in FIG. 6, the greater the driving load immediately before a stop request is made, that is, the greater the discharge pressure COMP of the compressor 80a, the greater the retard amount RE is set.

The period during which the torque reduction control is executed is divided into a maintaining period REHT, during which the retard amount RE of the ignition timing is maintained, and a reduction period RERT after the maintaining period REHT. During the reduction period RERT, the retard amount is gradually reduced to zero. The maintaining period REHT and the reduction period RERT are set to be appropriate for suppressing sudden increases in the engine speed.

If a similar torque reduction control is to be executed when an engine stop request is made during the operation of the auxiliary devices other than the compressor 80a, it may be configured that, for example, the retard amount RE increases according to an increase in the output of the alternator 80b or an increase in the hydraulic pressure generated by the hydraulic pump 80c.

When the ignition retard is executed for the predetermined execution period, the torque reduction control in step S220 is stopped, and the process is temporarily suspended.

Figure 7:
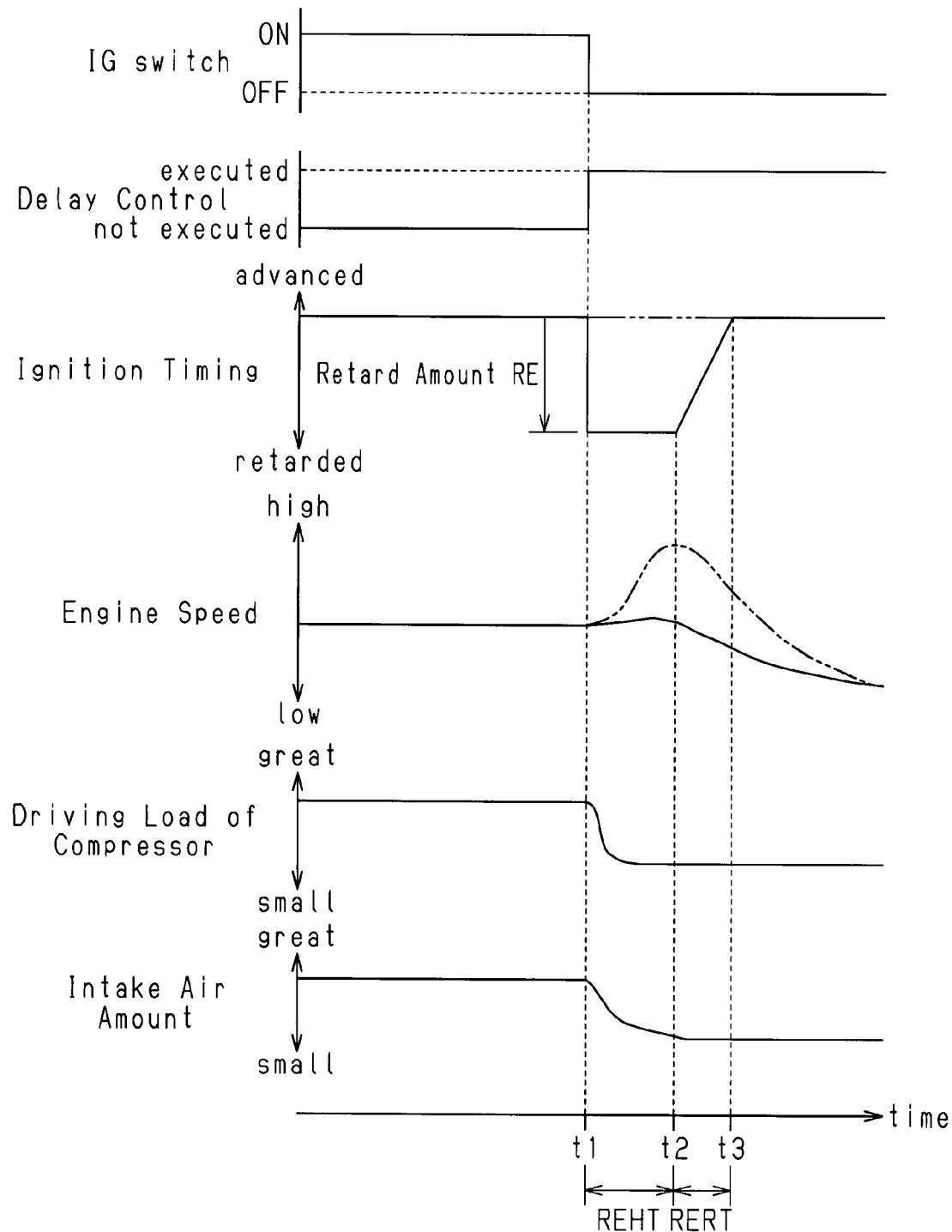
FIG. 7 is a time chart showing an example of suppression of a sudden increase in the engine speed through execution of the torque reduction process.

FIG. 7 shows an example of suppression of a sudden increase in the engine speed through the execution of the torque reduction process. Prior to time t1 in FIG. 7, the compressor 80a has been operating.

As shown in FIG. 7, when the IG switch 97 is turned off (time t1), the delay control is initiated and the compressor 80a is stopped. As the compressor 80a is stopped, its driving load starts reducing. The intake air amount, which has been increased in accordance with the driving load of the compressor 80a, is reduced according to the reduction in the driving load caused by stopping of the compressor 80a. Since the rate at which the intake air amount is reduced is less than the rate of reduction in the driving load caused by stopping of the compressor 80a, a response delay occurs in reduction in the engine power relative to the reduction in the driving load according to the stopping of the compressor 80a. Therefore, when the torque reduction process is not executed, a sudden and temporary increase in the engine speed occurs as shown by a chain double-dashed line in FIG. 7. In this embodiment, when the IG switch 97 is turned off (time t1), the torque reduction control is executed. Specifically, at time t1, the ignition timing is retarded by the retard amount RE, and the retard amount RE is maintained from time t1 to time t2 for suppressing sudden increases in the engine speed. When the maintaining period REHT for maintaining the retard amount RE is over (time t2), the retard amount RE starts being reduced, so that the ignition timing is gradually advanced. In this manner, by gradually decreasing the retard amount RE, the engine power, which has been temporarily reduced, is smoothly restored. When the decrease of the retard amount RE is complete, that is, when the retard amount RE is 0 and the reduction period RERT (from time t2 to time t3) is over (time t3), the torque reduction control is ended.

That is, in this embodiment, when an engine stop request is made during the compressor 80a is operating, the ignition timing is temporarily retarded in the above described manner. Thus, the engine power is temporarily reduced immediately after the delay control is initiated, so that sudden increases in the engine speed are suppressed.

The electronic control unit 60 functions as a delay control section for executing the delay control, a load compensation section for executing the load compensation control, a power adjusting section for executing the power reduction control, and a changing section that, after the delay control is started, changes a valve parameter of the intake valve 19 to a value suitable for starting the engine.

The embodiment described above provides the following advantages.

(1) In the engine 1, the delay control and the load compensation control are executed. In the delay control, the period from when an engine stop request is made to when the engine is actually stopped is extended. In the load compensation control, the engine power is adjusted according to the driving load of the auxiliary devices 80. Also, the torque reduction control (power reduction control) is executed in which, when an engine stop request is made during the operation of the compressor 80a, the engine power is temporarily reduced by changing an engine control value. Therefore, in the engine 1, in which the delay control and the load compensation control are executed, it is possible to suppress a sudden increase in the engine speed that is likely to occur when an engine stop request is made during the operation of the compressor 80a.

(2) The change amount (retard amount RE) of the engine control value (ignition timing) is set according to the driving load (discharge pressure) of the compressor 80a immediately before an engine stop request is made. Thus, sudden increases in the engine speed are reliably suppressed.

(3) The greater the driving load immediately before the stop request is made, the greater the change amount of the engine control value is set. Specifically, the higher than discharge pressure of the compressor 80a, the greater the change amount of the engine control value is set. Thus, the amount of change of the engine control value is appropriately set according to the driving load of the compressor.

(4) The change amount of the engine control value is temporarily maintained after the engine control value is changed. Therefore, after the engine control value is changed, a decrease of the engine power is maintained for a certain period of time. This reliably suppresses sudden increases in the engine speed.

(5) The change amount of the engine control value is gradually reduced after the engine control value is changed. Thus, the engine power, which has been temporarily reduced, is smoothly restored.

(6) When executing the torque reduction control, the ignition timing is retarded. Thus, at the execution of the torque reduction control, the engine power can be changed quickly.

(7) In the engine 1, the delay control is executed for changing a valve parameter of the intake valve 19 to a value suitable for starting the engine after an engine stop request is made. In this engine 1, if the compressor 80a is operating when an engine stop request is made, the engine speed is likely to suddenly increase. However, in this embodiment, since the above described torque reduction control is executed in the engine 1, such sudden increases in the engine speed are suppressed.

Second Embodiment

A control apparatus for an internal combustion engine according to a second embodiment of the present invention will now be described with reference to FIGS. 8 to 12.

In the first embodiment, the compressor 80a coupled to the engine 1 is a fixed displacement type.

On the other hand, in the second embodiment, a swash plate type variable displacement compressor 180 is coupled to the engine 1. The variable displacement compressor 180 is capable of changing the discharge pressure of refrigerant. The torque reduction control is executed in accordance with the characteristics of the variable displacement compressor 180. The second embodiment is basically the same as the first embodiment except for the type of the compressor and the manner in which the torque reduction control is executed. Accordingly, the control apparatus for an internal combustion engine according to the second embodiment will be described while mainly discussing these differences.

Figure 8:
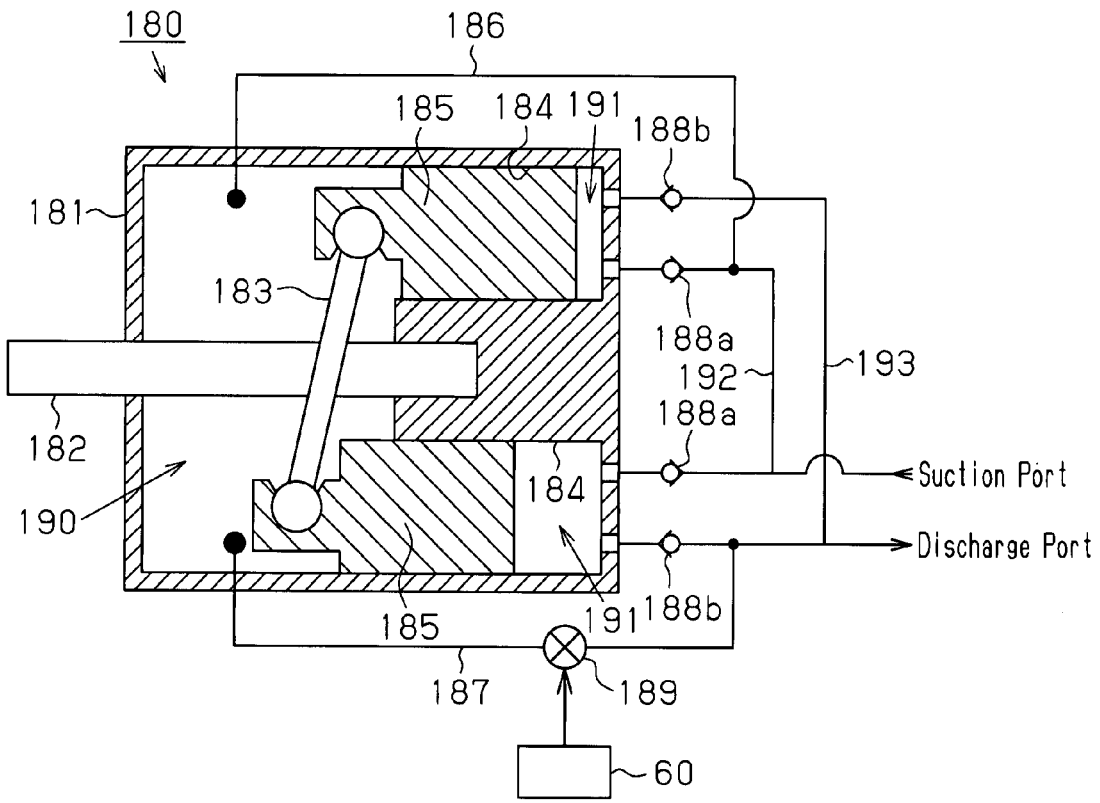
FIG. 8 is a diagrammatic view illustrating the basic structure of a swash plate type variable displacement compressor according to a second embodiment.

FIG. 8 is a schematic diagram showing the basic structure of the swash plate type variable displacement compressor 180 (hereinafter, referred to as a compressor 180).

The compressor 180 includes a housing 181, a drive shaft 182, a swash plate 183, cylinder bores 184, pistons 185, a bleed passage 186, a supply passage 187, suction check valves 188a, discharge check valves 188b, a control valve 189.

The housing 181 supports the drive shaft 182, which is rotated by the engine power. The swash plate 183, the inclination angle of which is changeable, is located in the housing 181. The swash plate 183 is rotated integrally with the drive shaft 182. The space in which the swash plate 183 is located in the housing 181 is a crank chamber 190.

The cylinder bores 184 are defined in the housing 181. Each cylinder bore 184 receives one of the pistons 185. In each cylinder bore 184, the space that is expanded and contracted according to reciprocation of the piston 185 is a compression chamber 191. Refrigerant is drawn into and compressed in the compression chamber 191. Refrigerant is drawn into each compression chamber 191 through a suction passage 192 and one of the suction check valves 188a. Refrigerant compressed in the compression chamber 191 is discharged to a refrigerant passage through one of the discharge check valve 188b and the discharge passage 193.

The swash plate 183 is slidably engaged with one end of each piston 185 that is opposite to the side corresponding to the compression chamber 191. That is, the swash plate 183 is coupled to an end of each piston 185 at a side corresponding to the crank chamber 190. In accordance with the inclination angle of the swash plate 183, the stroke amount of the pistons 185 is changed. That is, according to the inclination angle of the swash plate 183, the compression amount of refrigerant is changed, and the discharge pressure is changed, accordingly.

The bleed passage 186 and the supply passage 187 are formed in the housing 181 as necessary. Through the bleed passage 186, some of the refrigerant drawn into each compression chamber 191 is conducted to the crank chamber 190. Through the supply passage 187, some of the refrigerant compressed in each compression chamber 191 is conducted to the crank chamber 190. The control valve 189 is located in the supply passage 187. The opening degree of the control valve 189 is adjusted by the electronic control unit 60. The amount of compressed refrigerant conducted to the crank chamber 190 is adjusted through the opening degree control of the control valve 189. The control valve 189 is fully opened when the IG switch 97 is turned off.

In the compressor 180, each piston 185 reciprocates in the associated compression chamber 191. When pressure applied to an end of each piston 185 that is opposite to an end corresponding to the compression chamber 191 (pressure applied to a back pressure surface) is increased, that is, when pressure applied to a side corresponding to the crank chamber 190 is increased, the pressure difference between the piston end corresponding to the compression chamber 191 and the piston end corresponding to the back pressure surface (the crank chamber 190) is reduced. Such a reduction in the pressure difference reduces the inclination angle of the swash plate 183, and the discharge pressure of the compressor 180 is reduced, accordingly.

In contrast, when the pressure applied to the side corresponding to the crank chamber 190 is reduced, the pressure difference between the piston end corresponding to the compression chamber 191 and the piston end of the back pressure side (end corresponding to the crank chamber 190) is increased. This increases the inclination angle of the swash plate 183. The discharge pressure of the compressor 180 is increased, accordingly.

Adjustment of the pressure applied to the back pressure surface is performed basically by changing the amount of compressed refrigerant conducted to a space corresponding to the back pressure surface. That is, the adjustment is performed through the control of the opening degree of the control valve 189.

Figure 9:
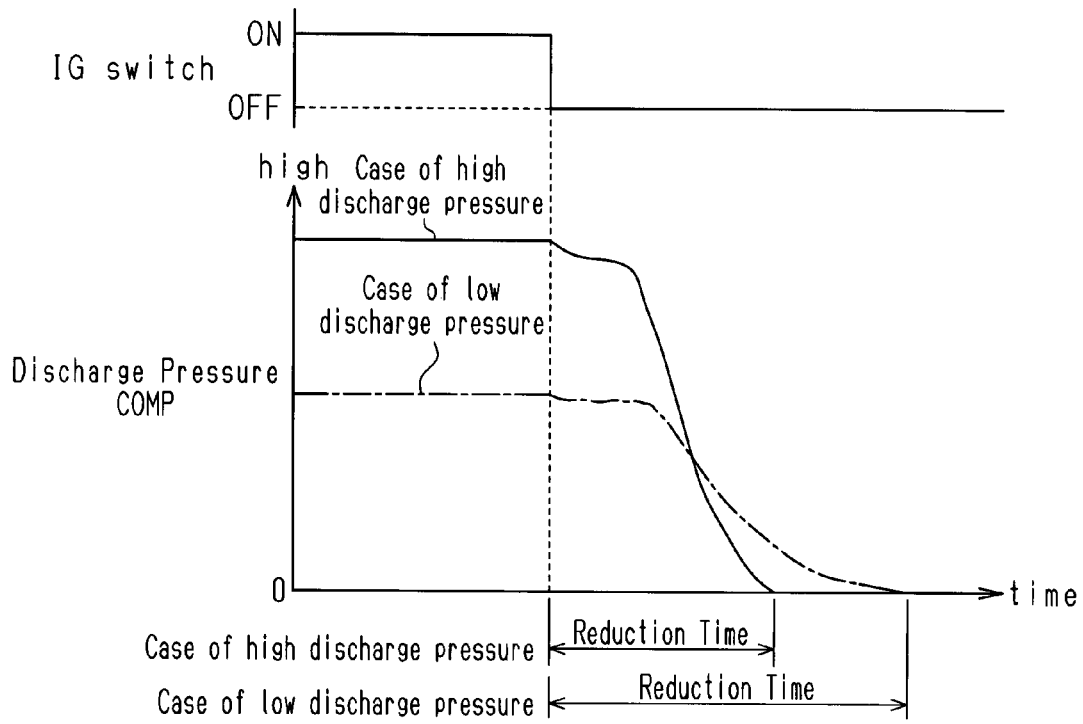
FIG. 9 is a time chart showing a reduction in driving load in cases of different discharge pressures.

When the compressor 180 is stopped, the control valve 189 is fully opened so that the inclination angle of the swash plate 183 is minimized (zero degrees or angle close to zero degrees), and a great amount of compressed refrigerant is conducted to the space corresponding to the back pressure surface. The higher the discharge pressure immediately before the compressor 180 is stopped, the greater amount of compressed refrigerant is conducted into the space. Thus, the higher the discharge pressure immediately before the compressor 180 is stopped, the higher the rate at which the inclination angle of the swash plate 183 is changed. Therefore, as shown in FIG. 9, the higher the discharge pressure COMP when the IG switch 97 is turned off, the shorter the period for the inclination angle of the swash plate 183 to be minimized (reduction time in FIG. 9) becomes. That is, the higher the discharge pressure COMP, the greater the rate at which the driving load of the compressor 180 is reduced becomes. In this manner, when the rate at which the driving load is reduced becomes greater, the rate at which the intake air amount, which is reduced in accordance with the reduction in the driving load, is increased. That is, the rate at which the engine power is reduced is increased with the above described response delay. Therefore, the period of a sudden increase in the engine speed tends to be shorter. Accordingly, in the torque reduction control of the second embodiment, the period for executing the power reduction control is changed based on the discharge pressure COMP of the compressor 180 immediately before an engine stop request is made. Specifically, the above described reduction period RERT is varied. Also, as in the first embodiment, the retard amount RE of the ignition timing is varied based on the discharge pressure COMP.

Figure 10:
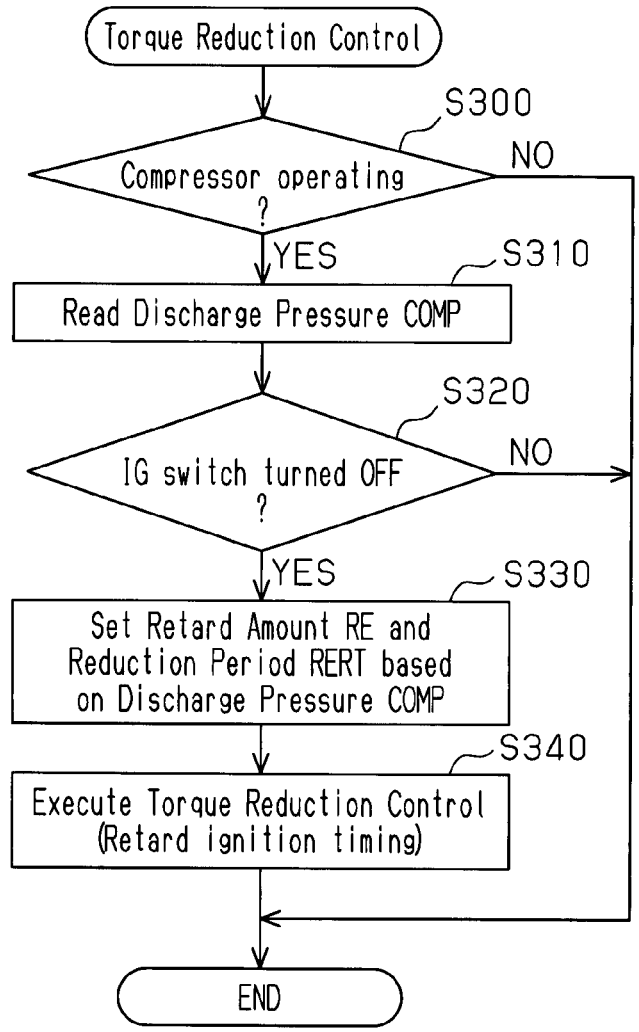
FIG. 10 is a flowchart showing a procedure of a torque reduction process according to the second embodiment.

FIG. 10 shows a procedure of the torque reduction control. The torque reduction control shown in FIG. 10 is repeated at predetermined time intervals by the electronic control unit 60.

When the process is started, whether the compressor 180 is currently operating is determined (S300). For example, the operational state is determined based on, for example, the on/off state of the air conditioner switch. If it is determined that the compressor 180 is not operating (NO at S300), this process is temporarily suspended.

On the other hand, when the compressor 180 is operating (YES at S300), the discharge pressure COMP is read (S310). Then, whether the IG switch 97 has been turned off is determined (S320). If it is determined that the IG switch 97 has not been turned off (NO at S320), this process is temporarily suspended since the delay control has not been initiated.

On the other hand, if it is determined that the IG switch 97 has been turned off (YES at S320), various parameters are set for executing the torque reduction control is executed at the same time as the delay control is initiated. That is, based on the discharge pressure COMP immediately before the IG switch 97 is turned off, in other words, based on the discharge pressure COMP immediately before an engine stop request is made, the retard amount RE of the ignition timing is set. Also, the reduction period RERT for gradually reducing the retard amount RE is set (S330).

When setting the retard amount RE, the higher the discharge pressure COMP, the greater the value of the retard amount RE is set as shown in FIG. 6.

Figure 11:
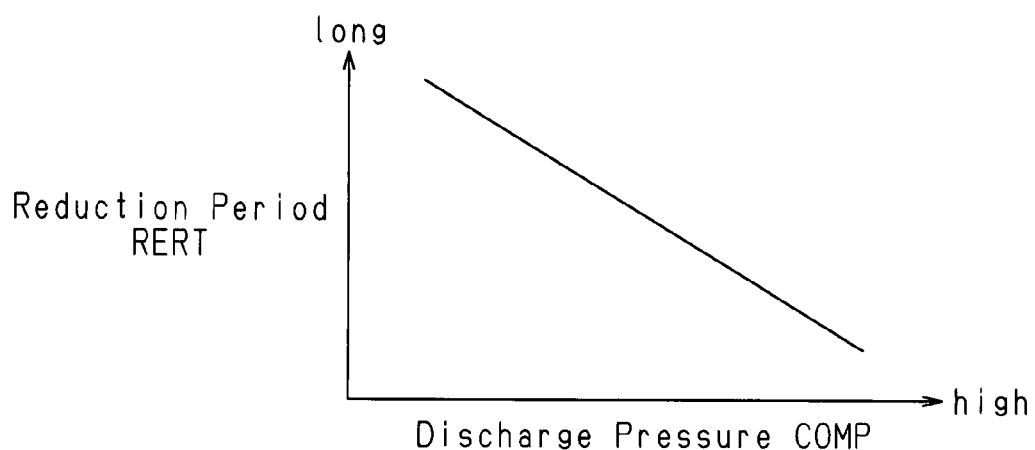
FIG. 11 is a conceptual diagram showing a reduction period of the amount of retard set based on a discharge pressure.

The reduction period RERT is set in the following manner. As described above, the higher the discharge pressure COMP, the greater the rate at which the driving load is reduced becomes. Therefore, the higher the discharge pressure COMP, the shorter the period for the driving load of the compressor 180 to be eliminated becomes. Thus, the greater the rate at which the driving load is reduced, the greater the rate at which the engine power, which is reduced in accordance with the reduction in the driving load, becomes. This shortens the period of a sudden increase in the engine speed. Accordingly, as shown in FIG. 11, the reduction period RERT is set to a shorter value as the discharge pressure COMP is increased. Since the reduction period RERT is set in this manner, the reduction period RERT when gradually reducing the retard amount RE of the ignition timing is appropriately set in accordance with the performance of the compressor 180.

Since the higher the discharge pressure COMP, the shorter the reduction period RERT is set, the period in which the torque reduction control is executed is shortened as the discharge pressure COMP is increased.

When the retard amount RE and the reduction period RERT are set, the torque reduction control is executed based on the retard amount RE, the maintaining period REHT, and the reduction period RERT (S340). When the torque reduction control, that is, the ignition retard is executed for the execution period including the maintaining period REHT and the reduction period RERT, the torque reduction control in stop S340 is stopped, and the process is temporarily suspended.

Figure 12:
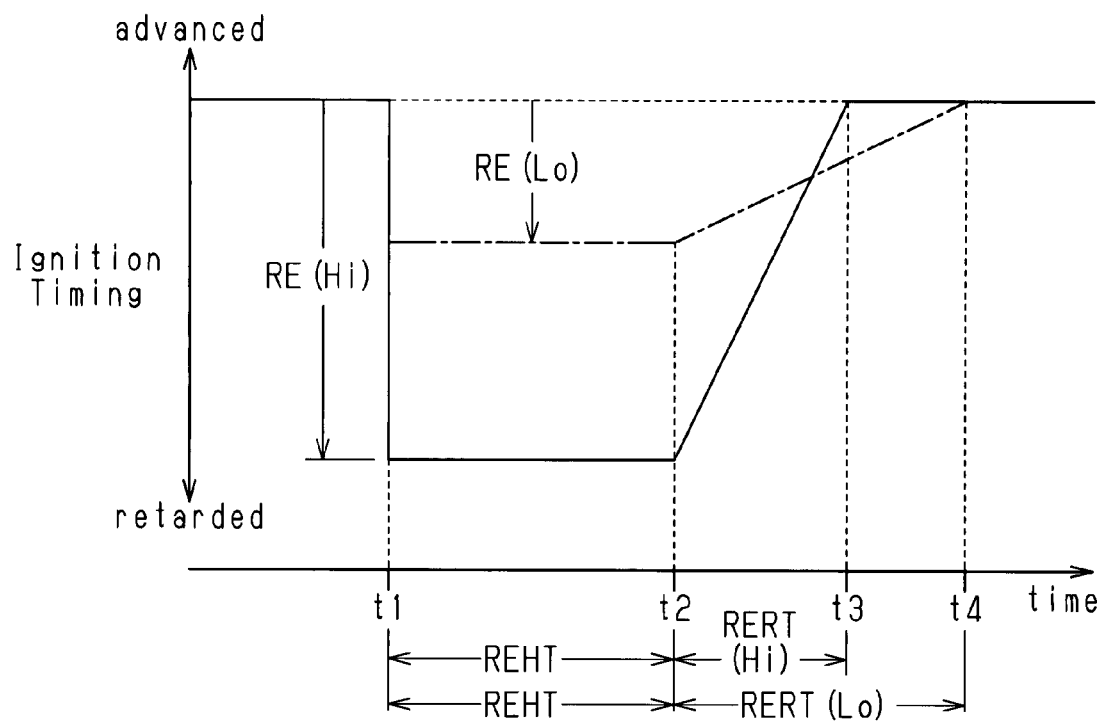
FIG. 12 is a time chart showing an example of ignition retard executed in the torque reduction process.

FIG. 12 shows an example of the ignition retard executed through the torque reduction process. Prior to time t1 in FIG. 12, the compressor 180 has been operating. In FIG. 12, solid line indicates changes in the ignition timing in a case where the discharge pressure COMP immediately before the IG switch 97 is turned off is high, and alternate long and short dash line indicates changes in the ignition timing in a case where the discharge pressure COMP is low.

As shown in FIG. 12, when the IG switch 97 is turned off (time t1), the delay control is initiated and the compressor 180 is stopped. Then, the above described torque reduction control is initiated. When executing the torque reduction control, a retard amount RE(Hi) used when the discharge pressure COMP is high is greater than a retard amount RE(Lo) used when the discharge pressure COMP is low. The retard amount is maintained in a period from time t1 to time t2 for suppressing sudden increases in the engine speed.

When the maintaining period REHT for maintaining the retard amount RE(Hi) or the retard amount (Lo) is over (time t2), the retard amount starts being reduced, so that the ignition timing is gradually advanced. In the reduction of the retard amount, a reduction period RERT(Hi) (from time t2 to time t3) is used when the discharge pressure COMP is high, and a reduction period RERT(Lo), which is shorter than the reduction period RERT(Hi), is used when the discharge pressure COMP is low (from time t2 to time t4). Therefore, when the discharge pressure COMP is high, the torque reduction control is ended sooner than the case where the discharge pressure COMP is low.

That is, in this embodiment, when an engine stop request is made during the compressor 180 is operating, the ignition timing is temporarily retarded in the above described manner. Thus, the engine power is temporarily reduced immediately after the delay control is initiated, so that sudden increases in the engine speed are suppressed.

Particularly, in the second embodiment, the period for executing the torque reduction control is changed based on the discharge pressure COMP immediately before an engine stop request is made. That is, the higher the discharge pressure COMP, the shorter the execution period is set. Therefore, the execution period is appropriately set in accordance with the performance of the compressor 180.

In addition to the advantages of the first embodiment, the second embodiment has the following advantages.

(1) In the case where a swash plate type variable displacement compressor (compressor 180) is used as one of the auxiliary devices 80, the execution period of the torque reduction control is set based on the discharge pressure COMP of the compressor immediately before an engine stop request is made. Therefore, the execution period of the torque reduction control is appropriately set in accordance with the performance of the swash plate type variable displacement compressor.

(2) Since the execution period is shortened as the discharge pressure COMP is increased, the execution period is appropriately set.

(3) The change amount (retard amount RE) of the engine control value (ignition timing) is gradually reduced after the engine control value is changed. In the case where a swash plate type variable displacement compressor is used as one of the auxiliary devices 80, the higher the discharge pressure COMP of the compressor immediately before an engine stop request is made, the shorter. the reduction period RERT is set. Therefore, when the change amount of the engine control value is gradually reduced, the reduction period RERT is appropriately set in accordance with the performance of the swash plate type variable displacement compressor.

The above embodiments may be modified as follows.

In the first embodiment, the retard amount RE may be a fixed value. In the second embodiment, the retard amount RE and the reduction period RERT may be fixed values. In these cases, since the engine power immediately after the delay control is initiated is temporarily reduced, the above described sudden increase in the engine speed is suppressed.

Figure 13:
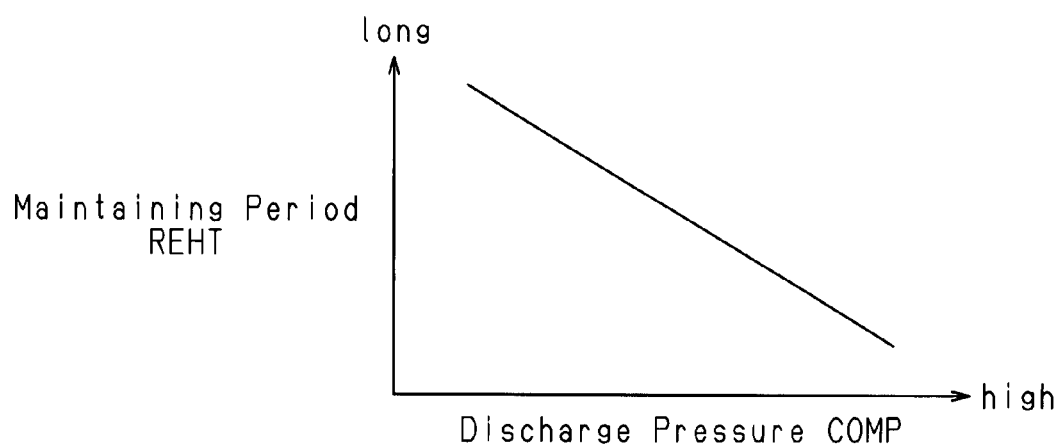
FIG. 13 is a conceptual diagram showing a maintaining period of the amount of retard set based on an discharge pressure in a modification of the second embodiment.

In the second embodiment, the maintaining period REHT may be variable. That is, as described above, the higher the discharge pressure COMP, the greater the rate at which the driving load is reduced becomes. Therefore, the higher the discharge pressure COMP, the shorter the period for the driving load of the compressor 180 to be eliminated becomes. Thus, the greater the rate at which the driving load is reduced, the greater the rate at which the engine power, which is reduced in accordance with the reduction in the driving load, becomes. This shortens the period of a sudden increase in the engine speed. Accordingly, as shown in FIG. 13, the maintaining period REHT is set to a shorter value as the discharge pressure COMP is increased. Since the maintaining period REHT is set in this manner, the maintaining period REHT for maintaining the retard amount RE after the ignition timing is retarded is appropriately set in accordance with the performance of the compressor 180.

The displacement of the compressor 180 according to the second embodiment is varied by the control valve 189, which is controlled by the electronic control unit 60. That is, the compressor 180 is an externally controlled type variable displacement compressor. Alternatively, an internally controlled variable displacement compressor may be used, in which the opening degree of a control valve is adjusted according to the suction pressure of refrigerant.

In the illustrated embodiments, the retard amount RE may be reduced immediately after the ignition timing is retarded. That is, the maintaining period REHT may be omitted.

In the illustrated embodiments, the retard amount RE may be reduced to zero immediately after the maintaining period REHT elapses. That is, the reduction period RERT may be omitted.

The torque reduction control may be modified to execute a process for reducing the intake air amount by a greater degree in the load compensation control than in the illustrated embodiments. Alternatively, the torque reduction control may be modified to execute a process for further reducing the fuel injection amount, which is reduced through the reduction in the intake air amount.

The present invention may be applied to a case where the intake air amount is adjusted by using an idle speed control valve in the load compensation control.

In the illustrated embodiments, the load compensation control is the idle speed control. Alternatively, the present invention may be applied to any type of internal combustion engine as long as a control for adjusting the engine power in accordance with the driving load of auxiliary devices is executed in the engine.

In the illustrated embodiments, the engine stop request is turning off of the IG switch 97 by a driver. Alternatively, when the present invention is applied to a vehicle that has an idle-stop feature for automatically stopping the engine during idling or a hybrid vehicle having an internal combustion engine and an electric motor, an automatic stop request of the engine may be regarded as a stop request of the illustrated embodiments. That is, the present invention may be applied to internal combustion engines having an idle-stop feature and internal-combustion engines of hybrid vehicles.

In the illustrated embodiments, the variable valve actuation unit 5 is provided for varying the valve parameters of the intake valve 19. However, the present invention may be applied to a case where the variable valve actuation unit 5 is provided for changing the valve parameters of the exhaust valve 20. In the illustrated embodiments, the variable valve actuation unit 5 includes the variable valve timing mechanism 51 and the variable valve duration mechanism 53. However, the present invention may be applied to a case where the variable valve actuation unit 5 includes only the variable valve timing mechanism 51 or only the variable valve duration mechanism 53. The variable valve actuation mechanism is not limited to the variable valve actuation unit 5, but may be any mechanism that varies a valve parameter of the intake valve 19 and the exhaust valve 20.

The present invention may be applied to an internal combustion engine that has no variable valve actuation unit 5. That is, the present invention may be applied to any type of engine that executes the delay control and the load compensation control.

The invention claimed is:

1. A control apparatus for an internal combustion engine, wherein an auxiliary device driven by the engine is coupled to the engine, wherein the apparatus executes a delay control for extending the period from when an engine stop request is made to when the engine is actually stopped, and a load compensation control for adjusting engine power in accordance with a driving load of the auxiliary device, the apparatus comprising:
  that the apparatus performs as the delay control, a procedure for continuously executing fuel injection and fuel ignition until a predetermined period elapses from when the engine stop request is made,
  a power adjusting section, wherein, when the engine stop request is made while the auxiliary device is operating, the power adjusting section executes a power reduction control for changing an engine control value such that the engine power is temporarily reduced.

2. The apparatus according to claim 1, wherein the engine control value includes an ignition timing, and wherein the power adjusting section retards the ignition timing when the power reduction control is executed.

3. The apparatus according to claim 1, the engine having an adjusting valve for adjusting an intake air amount, wherein the engine control value includes an opening degree of the adjusting valve, and wherein, when the power reduction control is executed, the power adjusting section adjusts the opening degree of the adjusting valve such that the intake air amount is reduced.

4. The apparatus according to claim 1, wherein the engine control value includes an amount of fuel supplied to the engine, and wherein the power adjusting section reduces the fuel supply amount when the power reduction control is executed.

5. The apparatus according to claim 1, wherein, when the load compensation control is executed, the apparatus adjusts the engine power such that an engine speed during idling seeks a predetermined target idle speed.

6. The apparatus according to claim 1, the engine having a variable valve actuation mechanism for changing a valve parameter of at least one of an intake valve and an exhaust valve,
  wherein the apparatus includes a changing section that, after the delay control is started, changes the valve parameter to a value suitable for starting the engine.

7. The apparatus according to claim 1, wherein the auxiliary device is a swash plate type variable displacement compressor, and wherein the power adjusting section sets an execution period of the power reduction control based on the discharge pressure of the compressor immediately before the engine stop request is made.

8. The apparatus according to claim 7, wherein the power adjusting section shortens the execution period as the discharge pressure is increased.

9. The apparatus according to claim 1, wherein, after changing the engine control value, the power adjusting section temporarily maintains the change amount of the engine control value at least during a part of the execution period of the power reduction control.

10. The apparatus according to claim 9, wherein the auxiliary device is a swash plate type variable displacement compressor, and wherein the power adjusting section shortens the period for maintaining the change amount as a discharge pressure of the compressor immediately before the engine stop request is made is increased.

11. The apparatus according to claim 1, wherein, after changing the engine control value, the power adjusting section gradually reduces the change amount of the engine control value at least during a part of the execution period of the power reduction control.

12. The apparatus according to claim 11, wherein the auxiliary device is a swash plate type variable displacement compressor, and wherein the power adjusting section shortens a period from when reduction of the change amount is started to when the reduction is complete as a discharge pressure of the compressor immediately before the engine stop request is made is increased.

13. The apparatus according to claim 1, wherein the power adjusting section sets a change amount of the engine control value in accordance with the driving load immediately before the engine stop request is made.

14. The apparatus according to claim 13, wherein the power adjusting section increases the change amount of the engine control value as the driving load is increased.

15. The apparatus according to claim 14, wherein the auxiliary device is a compressor of an air conditioner, and wherein the power adjusting section increases the change amount as a discharge pressure of the compressor immediately before the engine stop request is made is increased.

* * * * *